July 21, 1959  A. A. WEISENBERGER  2,896,197
TIRE CURING SENTINEL SYSTEM
Filed Oct. 24, 1956

INVENTOR.
ADAM A. WEISENBERGER.
BY
ATTORNEY.

July 21, 1959     A. A. WEISENBERGER     2,896,197
TIRE CURING SENTINEL SYSTEM
Filed Oct. 24, 1956     2 Sheets-Sheet 2
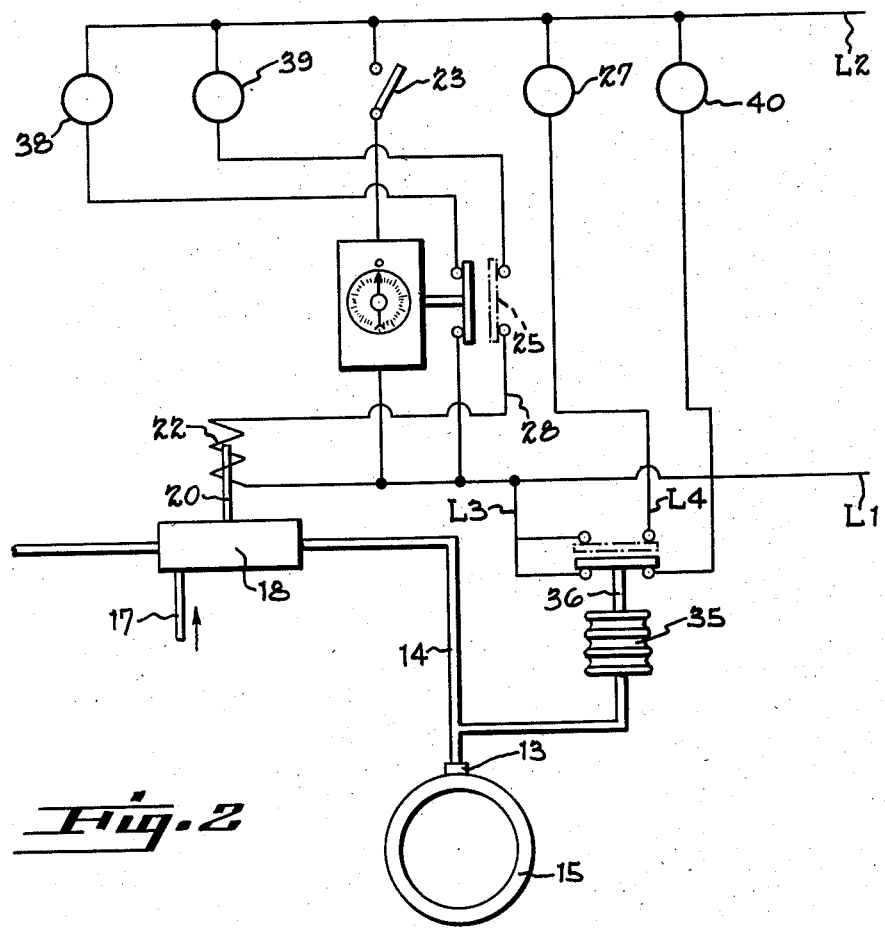
*Fig. 2*
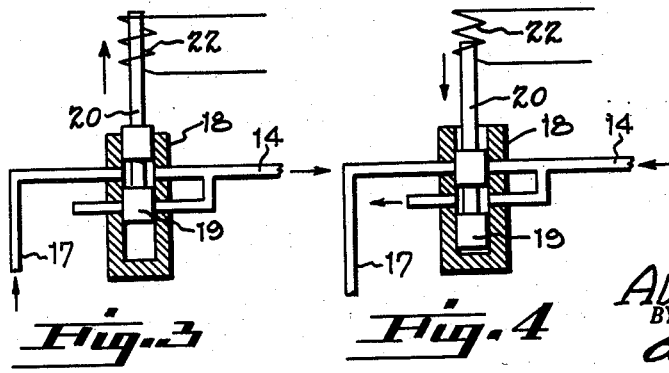
*Fig. 3*     *Fig. 4*
INVENTOR.
ADAM A. WEISENBERGER.
BY
ATTORNEY.

2,896,197

TIRE CURING SENTINEL SYSTEM

Adam A. Weisenberger, Mack, Ohio, assignor to Sentinel Signal Corporation, Cincinnati, Ohio, a corporation of Ohio Application October 24, 1956, Serial No. 618,076

1 Claim. (Cl. 340—267)

My invention relates to a tire curing sentinel system.

The principal object of my invention is to provide a sentinel system used in the process of retreading motor vehicle tires.

Another object of my invention is to provide automatic means for supplying air at selected pressure to a tire mold.

Another object of my invention is to provide a system which indicates the operativeness of the molds by the employment of signal devices.

Another object of my invention is to provide a signalling device which is interconnected with a clock which limits automatically the amount of air supplied to the mold.

Another object is to provide a signalling system with the clock and a pressure control unit which will be inoperative when air under pressure is interfered with in its path to the mold.

Other objects of my invention will be apparent from a reading of the detailed description below.

In the drawings I show in

Fig. 1 a mold unit with the sentinel system connected in the pressure line.

Fig. 2 is a wiring diagram of the sentinel unit.

Fig. 3 shows the valve in its open position.

Fig. 4 shows a valve in its closed position.

Figure 1:
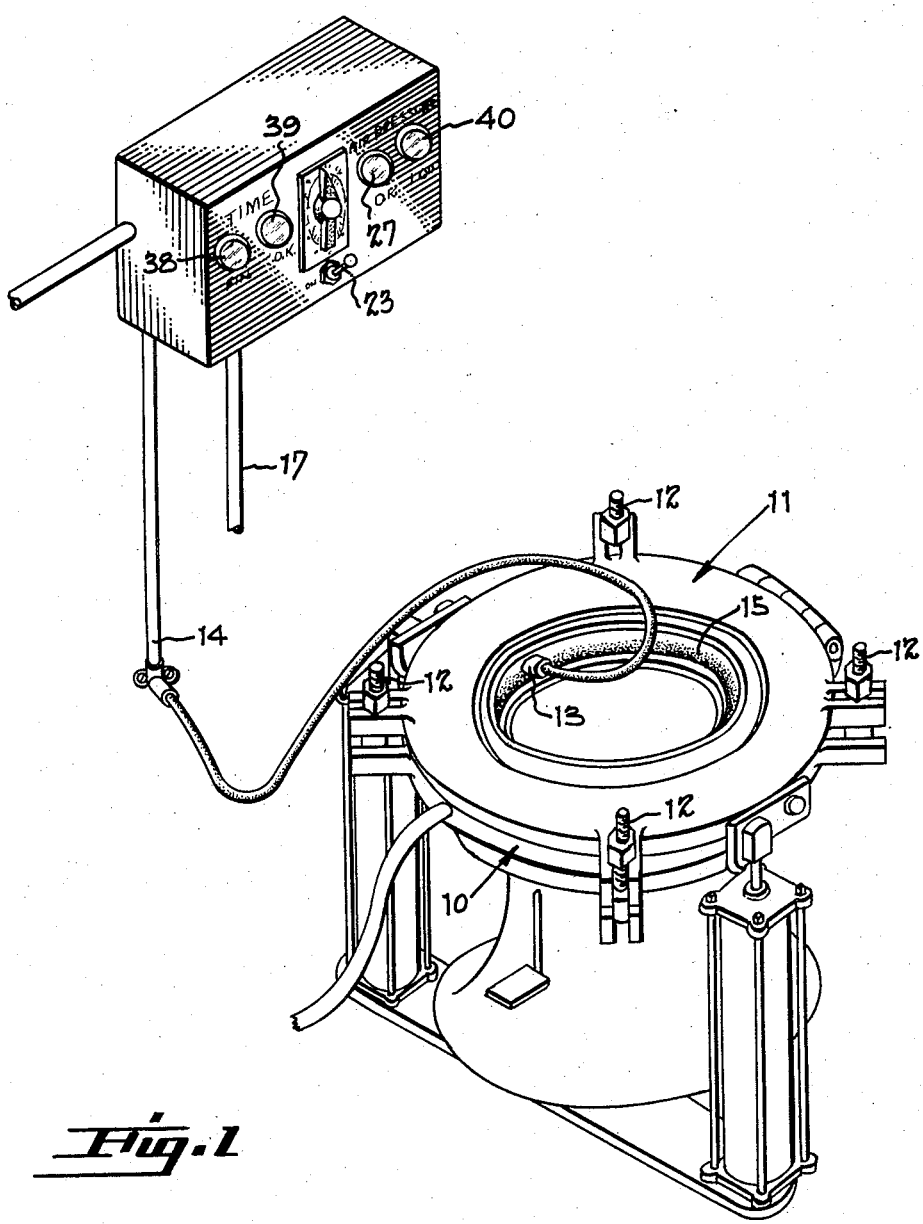

In general, my invention consists of the application of a sentinel system to the air line of a mold used for curing and retreading motor vehicle tires.

I employ a pressure unit responsive to variables in air pressure and a clock unit for limiting the time under which air under pressure is supplied to the mold.

In the drawings I show a mold into which a tire casing which is to be cured is placed, the mold being first lubricated. The tire is secured within the mold and has an air bag within its casing to which is secured an air hose. The mold 10 comprises a base and a cover member 11 which is held in place by bolts such as 12. The air bag 15 is secured to the air supply line by means of an open valve 13. The supply line 14 connects to a source of air pressure from a sentinel control unit mounted adjacent to the mold.

Referring to Fig. 2 we show an open air chuck 13 which is connected through a pipe 17 to a valve 18. The valve 18 is supplied with a plunger 19 which is operable in response to an electrical control unit such as a solenoid. The valve 18 has a stem 20 which protrudes within a solenoid 22. The solenoid when charged causes the valve to operate to permit air to flow through the valve 18 and into the air chuck 13. To begin operation, I preset the clock mechanism and then close a switch 23 to close an electrical circuit. The electrical circuit is indicated with leads L1 and L2 and after the clock mechanism has been set a plunger device secured to said clock moves outwardly to contact position as shown at 25 causing a circuit to flow from L2 through line 28 to energize the solenoid 22 which causes valve stem 20 to be lifted to permit air under pressure to flow in conduit 17 through the valve and into the air chuck. An air pressure control device 35 is secured to the conduit connected to the air chuck 13 and to the valve 18. When the pressure control device 35 is operable the green light 27 will be on indicating said operation. The air pressure control unit is such that it will become operable when air pressure has reached a figure greater than 120 lbs. Experience has taught that the best pressure to be utilized for curing tires is 120 minimum to 160 maximum. The air pressure control is such that when the pressure is below 120, such as shown in the full lines in the drawing Fig. 2, the circuit will be closed from L3 and the red light 40 will indicate low pressure. When sufficient pressure is in the system the stem 36 is raised to cause the circuit from L3 to be opened and the circuit on L4 to close to indicate the signal light green when the pressure responsive system is in operating position.

Initially upon closing the switch 23, the blue light 38 is in a circuit indicating that the system has not been operated. When the timing apparatus is manipulated and positioned to a preselected position a green light 39 indicates that the timing mechanism has been placed in operable position. When the allotted time for the tire cure has expired, the electrical circuit will open, the green signal light 39 will be off, the electrical circuit in which the blue light is located is closed, the solenoid valve will be deenergized to open and shut off the air supply to the air bag and to permit the exhaust of the air as indicated in Fig. 4.

The drop in the air pressure will cause the pressure control unit to be activated to cause the red light 40 to indicate that low air pressure is now in the system and the green light 39 indicating when air pressure is proper will be out.

I have found in the operation of my device that I eliminate damage to tires by reason of the failure of air pressure or by the failure of the operator to properly gauge the elapsed time. My invention in effect automatically provides for constant preselected air pressure to the tire within the mold.

It will be apparent to those skilled in the art that other types of signal devices other than lights may be used in my invention, and accordingly, therefore, I claim my invention broadly as indicated by the appended claim.

I claim:

In a mold unit of the character described, the combination of a chamber for receiving a tire casing, air bag within said tire casing, an air hose secured to said tire casing at one end and secured to an air pressure source unit at its other end, predetermined timing means secured within said air hose between said air bag and said air pressure source unit, comprising, a solenoid operated valve actuated in response to presettable timing mechanism, signal means connected to said timing mechanism, and operable in accordance with the setting of said timing mechanism, said timing mechanism operable to close the flow of air through said air hose at the end of a predetermined period of time to actuate the signal means.

References Cited in the file of this patent

UNITED STATES PATENTS

| 2,204,513 | Sandberg et al. | June 11, 1940 |
| 2,204,531 | Erbguth et al. | June 11, 1940 |
| 2,260,966 | Brundage | Oct. 28, 1941 |
| 2,313,247 | Krow | Mar. 9, 1943 |
| 2,321,326 | Soderguist | June 8, 1943 |
| 2,595,588 | Lee et al. | May 6, 1952 |
| 2,615,082 | Mamola | Oct. 21, 1952 |